US005747145A

United States Patent [19]

Sorriero et al.

[11] Patent Number: 5,747,145

[45] Date of Patent: May 5, 1998

[54] COPOLYMER BLEND FOR TONER RECEIVER

[75] Inventors: Louis Joseph Sorriero, Rochester; John J. Fitzgerald, Clifton Park, both of N.Y.

[73] Assignee: Eastman Kodak Company, Rochester, N.Y.

[21] Appl. No.: 572,213

[22] Filed: Dec. 13, 1995

[51] Int. Cl.[6] .......... C03G 13/14

[52] U.S. Cl. .......... 428/195; 428/514; 525/212; 525/217; 525/221; 525/222; 525/223; 525/241

[58] Field of Search .......... 525/212, 217, 525/221, 222, 223, 241; 428/195, 514

[56] References Cited

U.S. PATENT DOCUMENTS

| | | | |
|---|---|---|---|
| 4,473,029 | 9/1984 | Fritz et al. | 118/657 |
| 4,927,727 | 5/1990 | Rimai et al. | 430/99 |
| 4,968,578 | 11/1990 | Light et al. | 430/126 |
| 5,037,718 | 8/1991 | Light et al. | 430/126 |
| 5,043,242 | 8/1991 | Light et al. | 430/126 |
| 5,045,424 | 9/1991 | Rimai et al. | 430/126 |
| 5,084,526 | 1/1992 | Harris et al. | 525/420 |
| 5,213,927 | 5/1993 | Kan et al. | 430/59 |
| 5,308,733 | 5/1994 | Rimai et al. | 430/126 |
| 5,366,841 | 11/1994 | Patel et al. | 523/322 |
| 5,369,169 | 11/1994 | La Fleur et al. | 525/217 |

OTHER PUBLICATIONS

R.M. Wiley, J. Colloid Science, vol. 9, p. 427, 1954.

*Primary Examiner*—Frederick Krass

*Attorney, Agent, or Firm*—Doreen M. Wells

[57] ABSTRACT

The composition of the present invention is a miscible blend comprising a first addition copolymer and a second addition copolymer, each having a weight-average molecular weight of about 30,000 to 100,000 and a number-average molecular weight of about 5,000 to 50,000, and each comprising repeating units of (1) at least one of an aromatic vinyl monomer of the structure,

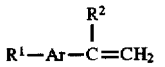

where Ar is phenylene or naphthylene and $R^1$ and $R^2$ are H or lower alkyl; and (2) at least one of (a) an acrylic ester of the structure

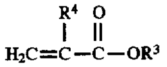

where $R^3$ is linear or branched $C_1$–$C_{10}$ alkyl and $R_4$ is H or lower alkyl, or (b) a divinyl compound of the structure

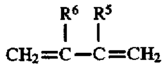

where $R^5$ and $R^6$ are H, Cl, or $CH_3$. The polymer composition comprises a miscible blend of the above-described first and second addition copolymers. The first addition copolymer further comprises repeating units of an acidic vinyl monomer, and the second addition copolymer further comprises repeating units of a basic vinyl monomer. Also in accordance with the present invention, an electrophotographic toner receiver for thermally assisted transfer comprises a substrate having a layer of a thermoplastic polymer composition on the surface thereof. The polymer composition comprises a miscible blend of the above-described first and second addition copolymers. Further in accordance with the invention, a method comprises the non-electrostatically transferring of small toner particles from the surface of a photoconductive element to the described toner receiver.

15 Claims, No Drawings

COPOLYMER BLEND FOR TONER RECEIVER

FIELD OF THE INVENTION

This invention relates to novel copolymer blends and, more particularly, to the use of such blends as coatings for electrophotographic toner receivers.

BACKGROUND OF THE INVENTION

It is possible by electrophotography to produce images of high resolution and low granularity that are of comparable quality to images produced by photography or lithography. To obtain copies or images of such high quality, the toner particles must be of small size, e.g., of 3 to 5 μm mean volume weighted diameter. However, the image quality is poor when the electrophotographic process uses the conventional electrostatic transfer method for transferring the small toner particles from the surface of the photoconductive element to the toner receiver. It is believed that the surface forces holding the small toner particles to the photoconductor surface dominate over the electrostatic transfer forces and prevent adequate transfer.

Recent patents, for example, U.S. Pat. No. 4,927,727, the disclosure of which is incorporated herein by reference, have disclosed that images made with small toner particles can be transferred with high efficiency by thermally assisted transfer (TAT). In the TAT method, the receiver is heated, e.g., to 60° to 90° C., and is pressed against the toner particles on the surface of the photoconductive element. The heat sinters the thermoplastic toner particles, causing them to stick together and to the receiver. The element and receiver are then separated and the toner image is fixed, e.g., thermally fused to the receiver.

To improve the transfer of toner from the photoconductive element to the receiver, a number of modifications have been made in the TAT process. For example, U.S. Pat. No. 4,968,578 describes applying to the receiver a thermoplastic coating and a layer of a release agent. This technique improves the image quality but the releasing agent can create problems, as mentioned in U.S. Pat. No. 5,043,242. The latter patent, the disclosure of which is incorporated herein by reference, discloses a receiver coating of a particular surface energy that provides good transfer without a release agent. Likewise, U.S. Pat. Nos. 5,037,718 and 5,045,424, the disclosures of which are incorporated herein by reference, disclose particular polymeric coatings for the receiver that provide good transfer without a release agent. The materials and procedures of these patents provide important advantages, but further improvement in the TAT process is desirable.

One need in the TAT process is for a toner receiver that will have a wider transfer latitude than materials heretofore available. By "transfer latitude" is meant the difference between (a) the "transfer temperature," at which the polymer coating on the receiver surface softens enough that toner particles on the photoconductive element will adhere to or become partially embedded in the polymer coating and thus transfer to the receiver, and (b) the "sticking temperature," at which the receiver begins to stick to the photoconductive element. More specifically, the sticking temperature is the highest temperature at the nip of an electrophotographic TAT apparatus where contact of the receiver and photoconductor surfaces in an untoned area results in no damage to either surface upon separation. Although not wishing to be bound by theoretical considerations, applicants believe that the sticking temperature is related to the dynamic mechanical behavior of the receiver thermoplastic polymer composition, and specifically to the width at half-height of the "tan δ," which is the ratio of the loss modulus to the storage modulus of the composition in the melt phase. This ratio, which is also referred to as the "dissipation factor," measures the inability of a material to behave in an elastic manner. This subject is discussed in J. D. Ferry, *Viscoelastic Properties of Polymers*, 2nd Ed., John Wiley and Son, 1970, p. 48, and in A. Rubin, *The Elements of Polymer Science and Engineering*, Academic Press, 1982, p. 417.

The transfer temperature is the lowest temperature at which toner particles forming a latent image on a photoconductive element will adhere to the thermoplastic polymeric composition of the receiver and be transferred from the photoconductor to the receiver surface with an efficiency of at least 98 percent. The transfer temperature is sensitive to both the $T_g$ and molecular weight of the receiver polymer.

In practice, the $T_g$ of the receiver polymeric composition is preferably at least about 50° C., more preferably at least about 52° C. The transfer temperature is generally 8° to 15° C. higher than the $T_g$, typically in the 60° to 75° C. range. A sticking temperature range of about 70° to 85° C. would correspond to a transfer latitude of 10° C., the minimum required to ensure good process control and high image quality.

Previously known receiver materials often exhibit a transfer latitude of 5° C. or less. In accordance with the present invention, a novel polymeric blend used to form a coating for the toner receiver has a high sticking temperature and a transfer latitude greater than about 12° C.

As stated by P. J. Flory in his treatise entitled "Principles of Polymer Chemistry" (1953), "It is well known that, regarding the mixing of thermoplastic polymers, incompatibility is the rule and miscibility and even partial miscibility is the exception." This statement and others relating to the rarity of miscible polymer blends are quoted in U.S. Pat. No. 5,084,526, the disclosure of which is incorporated herein by reference. The Flory quotation indicates the unexpectedness of the properties of the novel miscible polymer blend of the present invention, in particular, its optical clarity and its characterization by a single glass transition temperature ($T_g$), as measured by differential scanning calorimetry. This is a property of major importance in forming coatings for receivers for the TAT process. Even though a polymer composition might have certain good properties, it would not be a suitable coating material for a TAT receiver if it exhibited more than a single $T_g$.

BRIEF SUMMARY OF THE INVENTION

The composition of the present invention comprises a novel thermoplastic blend of two linear addition copolymers. One of these copolymers includes repeating units of an acidic monomer, while the other includes repeating units of a basic monomer. Unlike most polymer blends, the novel composition is a miscible blend having a single glass transition temperature, $T_g$, and, when used as a surface coating for a toner receiver in thermally assisted transfer of toner, has a wide transfer latitude. More particularly, the composition of the invention is a miscible blend comprising a first addition copolymer and a second addition copolymer, each having a weight-average molecular weight of about 30,000 to 100,000 and a number-average molecular weight of about 5,000 to 50,000, and each comprising repeating units of (1) at least one of an aromatic vinyl monomer of the structure,

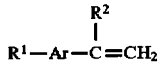

where Ar is phenylene or naphthylene and $R^1$ and $R^2$ are H or lower alkyl; and (2) at least one of (a) an acrylic ester of the structure

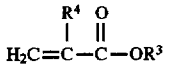

where $R^3$ is linear or branched $C_1$–$C_{10}$ alkyl and $R_4$ is H or lower alkyl, or (b) a divinyl compound of the structure

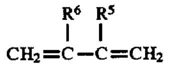

where $R^5$ and $R^6$ are H, Cl, or $CH_3$. The first addition copolymer further comprises repeating units of an acidic vinyl monomer, and the second addition copolymer further comprises repeating units of a basic vinyl monomer.

Also in accordance with the present invention, an electrophotographic toner receiver for thermally assisted transfer comprises a substrate having a layer of a thermoplastic polymer composition on the surface thereof. The polymer composition comprises a miscible blend of the above-described first and second addition copolymers.

Further in accordance with the present invention, a method of nonelectrostatically transferring toner particles of small size from the surface of a photoconductive element to the above-described electrophotographic toner receiver comprises the steps of (a) contacting the toner particles with the layer of thermoplastic polymer composition of the receiver; (b) heating the receiver to a temperature such that the temperature of the layer of thermoplastic polymer composition of the receiver during the transferring is at least 5° C. above the glass transition temperature, $T_g$, of the thermoplastic composition; and (c) separating the receiver from the photoconductive element at a temperature above the $T_g$ of the thermoplastic composition, whereby virtually all of the toner particles are transferred from the surface of the element to the layer of thermoplastic polymer composition of the receiver.

DETAILED DESCRIPTION OF THE INVENTION

The novel polymer composition that forms the surface layer or coating for the TAT receiver of the invention is a miscible blend comprising two addition polymers. As pointed out in U.S. Pat. No. 5,084,526 cited above, miscible blends of polymers are rare. In accordance with the present invention, however, such a miscible blend is formed when the monomers described herein are employed; the resulting miscible blend has a single glass transition temperature ($T_g$). Without the valuable property of a single $T_g$, the blend would not be of practical value as a receiver layer in the thermally assisted transfer of fine toner particles.

Of equal importance is another unexpected property of the blend, namely, its wide transfer latitude in the TAT process. As will be demonstrated in examples hereinafter, the transfer latitude of the polymer blends of the invention is at least about 12° C. and can be greater than 26° C. Thus, with the receiver layers of the invention it is possible to transfer toner from the photoconductive element to the receiver over a wide temperature range, without causing the receiver to stick to the photoconductive element.

In accordance with the present invention, the miscible blend comprises a first addition copolymer and a second addition copolymer, each having a weight-average molecular weight of about 30,000 to 100,000 and a number-average molecular weight of about 5,000 to 50,000, and each comprising repeating units of (1) at least one of an aromatic vinyl monomer of the structure,

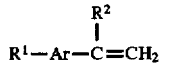

where Ar is phenylene or naphthylene and $R^1$ and $R^2$ are H or lower alkyl; and (2) at least one of (a) an acrylic ester of the structure

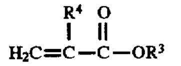

where $R^3$ is linear or branched $C_1$–$C_{10}$ alkyl and $R_4$ is H or lower alkyl, or (b) a divinyl compound of the structure

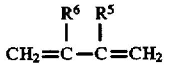

where $R^5$ and $R^6$ are H, Cl, or $CH_3$. The first addition copolymer further comprises repeating units of an acidic vinyl monomer, and the second addition copolymer further comprises repeating units of a basic vinyl monomer. The weight-average and number-average molecular weights of the addition copolymers are determined by gel permeation chromatography, as discussed in column 11 of the previously mentioned U.S. Pat. No. 5,045,424, the disclosure of which is incorporated herein by reference.

The acidic vinyl monomer comprises a compound having the structure

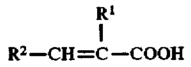

(a)

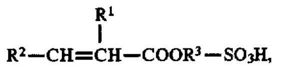

(b)

or $R^4$—Ar—CH=$CH_2$ (c)

where Ar is phenylene or naphthylene, $R^1$ is H or $CH_3$, $R^2$ is H or $C_1$–$C_6$ alkyl, $R^3$ is $C_2$–$C_6$ alkylene, and $R^4$ is —COOH or —$SO_3H$. Methacrylic acid and acrylic acid are especially preferred, methacrylic acid being most preferred.

The basic vinyl compound comprises 2-vinylpyridine, 4-vinylpyridine, or a compound having the structure

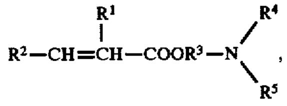

where $R^1$ is H or $CH_3$, $R^2$ is H or $C_1$–$C_6$ alkyl, $R_3$ is $C_2$–$C_6$ alkylene, and $R_4$ and $R_5$ are each $C_1$–$C_4$ alkyl. 4-Vinylpyridine and 2-vinylpyridine are especially preferred, 4-vinylpyridine being most preferred.

The first addition copolymer of the miscible blend comprises one to 25 weight percent, preferably 2 to 10 weight percent, and most preferably 2.5 to 5 weight percent of the acidic vinyl monomer. The second addition copolymer comprises one to 25 weight percent, preferably 20 to 10 weight percent, and most preferably 2.5 to 5 weight percent of the basic vinyl monomer.

The weight ratio of aromatic vinyl monomer to acrylic ester or divinyl compound in the first and second addition copolymers is from about 20:1 to 1:20, preferably from about 8:1 to 1:2, and most preferably from about 4:1 to 1:1. The weight ratio of first addition polymer to second addition polymer in the miscible blend is preferably about 1:1.

The aromatic vinyl monomers utilized to form the first and second addition copolymers are preferably styrene compounds, especially styrene, 3-methylstyrene, 4-methylstyrene, α-methylstyrene, 4-t-butylstyrene, or mixtures thereof. Most preferred are styrene or a commercially available mixture of 3-and 4-methylstyrene, sometimes referred to as "vinyltoluene."

Divinyl compounds used to prepare the addition copolymers comprising the miscible blend of the invention include 1,3-butadiene and substituted derivatives thereof, including 2-methyl-1,3-butadiene, 2-chloro-1,3-butadiene, 2,3-dimethyl-1,3-butadiene, and mixtures thereof. 1,3-Butadiene is especially preferred.

The acrylic ester monomers employed in the formation of the addition copolymers are preferably esters of acrylic acid, including ethyl acrylate, butyl acrylate, hexyl acrylate, 2-ethylhexyl acrylate, and mixtures thereof. Butyl acrylate and 2-ethylhexyl acrylate are especially preferred.

As previously noted, the miscible blends of the invention exhibit a single glass transition temperature, $T_g$, which falls between the $T_g$'s of the first and second copolymers comprising the blend. The glass transition temperature, $T_g$, of the miscible blends of the invention preferably lie between about 40° and 70° C., most preferably between about 50° and 60° C., as measured by differential scanning calorimetry.

The thermally assisted transfer (TAT) of toner particles of very small size having a mean volume diameter of less than about 8 μm (as measured by commercially available particle diameter measuring devices, e.g., a Coulter Multisizer, sold by Coulter Inc.) is described in the previously mentioned U.S. Pat. Nos. 4,927,727 and 5,043,242, the disclosures of which are incorporated herein by reference. In a TAT process, the toner receiver is preheated to a temperature that is adequate to fuse the transferred toner particles at their points of contact but not so high as to cause melting or coalescence of the particles. Pressure aids in the transfer of the toner particles to the receiver; an average nip pressure of about 135 to 1000 kPa is preferred. Residence time of the receiver in the nip is very short, typically on the order of about 15 milliseconds.

The nip temperature range for the thermally assisted toner transfer process is limited by the properties of the photoconductor, the toner particles, including the $T_g$ of the toner binder, and the receiver, including the $T_g$ of the thermoplastic polymer composition on its substrate surface. With respect to the photoconductor, increasing its temperature causes an increase in the rate of dark decay. The toner particles employed comprise polymeric binders generally having $T_g$'s of about 40° to 120° C., preferably about 50° to 100° C. Useful toner binders, including the preferred polymers and copolymers of styrene and acrylic ester monomers, are discussed in columns 22–23 of U.S. Pat. No. 5,045,424 and in columns 5–6 of U.S. Pat. No. 4,968,578, the disclosures of which are incorporated herein by reference. As previously noted, the miscible blends in the toner receiver of the present invention have $T_g$'s of about 40° to 70° C., preferably about 50° to 60° C., as determined by differential scanning calorimetry.

As previously discussed, the transfer latitude is a temperature range defined at its lower end by the transfer temperature, the minimum at which acceptable transfer of toner from the photoconductive element to the receiver can be achieved, and at its higher end by the sticking temperature, at which the thermoplastic composition of the receiver begins to adhere to the photoconductive element. The transfer temperature is a function of various receiver properties, including the molecular weight and $T_g$ of the thermoplastic composition. In general, the transfer temperature is about 8° to 15° C. higher than the $T_g$ of the thermoplastic composition on the receiver substrate. The sticking temperature depends at least partially on the elastic properties of the receiver and the adhesive forces between the photoconductor and the thermoplastic composition.

To ensure adequate process control and acceptable image quality, the transfer latitude should be at least about 10° C. The present invention provides a toner receiver comprising thermoplastic compositions with substantially elevated sticking temperatures compared to previously known compositions. This results in greatly improved transfer latitude of at least about 13° C. and, in preferred embodiments, at least about 18° C.

The electrophotographic toner receiver of the invention is formed by applying the miscible blend to a substrate in various ways known in the art, for example, by solvent coating or melt extrusion. Coating aids such as a polymethylphenylsiloxane (for example, DC-510™ having a methyl:phenyl ratio of 23:1, available from Dow-Corning Company) can be used to facilitate the coating of the blend on the substrate. The substrate can be a transparent film or, preferably, paper. More preferably, the paper substrate is coated on each side with a layer of polyolefin. Procedures for forming receivers are discussed in columns 15–19 of the previously mentioned U.S. Pat. No. 5,045,424, the disclosure of which is incorporated herein by reference.

The addition polymers comprising the miscible blend of the invention can be prepared by a variety of methods known to those skilled in the art. One convenient technique is particulate stabilized suspension (limited coalescence) polymerization, as described in R. M. Wiley, *J. Colloid Science*, Vol. 9, p. 427 (1954), the disclosure of which is incorporated herein by reference.

Following washing and drying, a first addition polymer having repeating units of an acidic vinyl monomer can be blended with a second addition polymer having repeating units of a basic vinyl monomer. Blending can be accomplished either by melting the two copolymers together or by dissolving them in a suitable solvent. Preferably, the blend contains the two copolymers in an approximately 1:1 weight ratio.

The following examples further illustrate the invention.

EXAMPLE 1

Preparation of Copolymers

Copolymers were prepared by the following particulate stabilized suspension polymerization procedure.

An organic phase consisting of a total of 100 grams of the desired monomers and 2.0 grams of the polymerization initiator Vazo 67™ (available from Dupont) was emulsified, using a Waring blender, with an aqueous phase containing 200 grams of distilled water, 2.0 grams of a 10% (w/w) aqueous solution of poly(methylaminoethylene adipate) (a condensation polymer prepared in-house by conventional methods), and 2.0 grams of Ludox™ 50% colloidal silica (available from Dupont), and buffered to pH 4.0 with 10.0 grams of phthalate buffer solution (from VWR Scientific). The resulting emulsion was placed in a reaction vessel equipped with a stirrer, condenser, and nitrogen inlet, and heated, with gentle stirring, at a temperature of about 77° C. for 16 hours. The mixture was then vented, heated to 90° C., and flushed with nitrogen to remove residual monomers, then cooled, and filtered. The collected polymeric product was washed with water, then dried in a vacuum oven.

Number-average ($M_n$) and weight-average ($M_w$) molecular weights were determined as polystyrene equivalent molecular weights by gel permeation chromatography as described in the previously mentioned U.S. Pat. No. 5,045,424. Glass transition temperatures were measured by differential scanning calorimetry, using a Perkin Elmer DSC-4 apparatus in combination with a Perkin Elmer 3600 data station. The temperature was calibrated with an indium standard, and samples were typically run between −20° and 100° C. at 10° C. per minute. Onset, midpoint, and terminal points of the transition were determined; the $T_g$ values listed represent the midpoint values of the measurements.

Table 1 below includes the component monomers, and $M_n$, $M_w$, and $T_g$ values of the copolymers prepared as described above.

reference. A styrene-butyl acrylate toner having a binder $T_g$ of 62° C. and a particle size of 3.5 μm was employed; there was no electrostatic bias between the receiver and the photoconductive element.

The front surface of the receiver was heated prior to transfer of the toner particles from the photoconductor to the receiver, which was accomplished by passage through the nip region of a pair of compression rollers, as described in U.S. Pat. No. 5,308,733, the disclosure of which is incorporated herein by reference. The heated roller comprised an aluminum core coated with Teflon. Air pressure to the unheated roller was sufficient to produce a force at the nip of $7.0 \times 10^3$ N/m along the length of the transfer rollers. The passage speed varied from 3.18 to 4.0 cm/sec.

Immediately following transfer, the receiver was separated from the photoconductor. The toner image on the receiver was ferrotyped by casting it against a sheet of Kapton-H™ and passing the receiver and the Kapton-H™ sheet at a speed of about 0.5 cm/sec through a pair of hard compression rollers, one heated to a temperature of about 110° C. and the other unheated. Three images were sequentially transferred in register. The minimum temperature of the receiver surface at the nip needed to effect transfer of the smaller toner particles from the photoconductor to a given receiver with at least 98 percent efficiency is defined as the transfer temperature for that receiver.

TABLE 1

| | Monomer (parts by weight) | | | | | | | | |
|---|---|---|---|---|---|---|---|---|---|
| Copolymer | Styrene | Vinyl-toluene* | Butyl acrylate | 2-Ethylhexyl acrylate | 4-Vinyl-pyridine | Methacrylic acid | $M_n$ | $M_w$ | $T_g$ (°C.) |
| 1 | 70 | — | 30 | — | — | — | 39,800 | 86,700 | 52 |
| 2 | 47.5 | — | 55 | — | — | 2.5 | 38,700 | 85,800 | 29 |
| 3 | 80 | — | 17.5 | — | 2.5 | — | 21,900 | 59,000 | 69 |
| 4 | 75 | — | 20 | — | — | 2.5 | 23,600 | 68,000 | 61 |
| 5 | 50 | — | 45 | — | 2.5 | — | 5,800 | 48,000 | 20 |
| 6 | — | 85 | — | 10 | — | 5.0 | 37,300 | 79,400 | 84 |
| 7 | — | 62.5 | — | 32.5 | 5.0 | — | 28,300 | 69,600 | 31 |
| 8 | — | 83 | — | 17 | — | — | 38,400 | 87,500 | 54 |

*mixture of 3- and 4-methylstyrene (from Dow Chemical Co.)

EXAMPLE 2

Preparation of Toner Receivers with Thermoplastic Copolymer Surface Layers

The following general procedure was used to prepare receivers having copolymer surface layers comprising miscible blends of the invention. Control receivers with surface layers containing prior art polymeric materials were also prepared.

The copolymer material to be coated was dissolved in methylene chloride containing 0.24 weight percent (based on the total weight of the solution) of Dow-Corning DC-510™ polymethylphenylsiloxane coating agent. The solution, containing 10 weight percent of copolymer, was coated on a polyethylene coated flexible paper substrate that had been corona treated to promote adhesion. The solvent was evaporated, leaving a 10 μm-thick layer of polymer on the substrate.

Transfer temperatures for the toner receivers so prepared were determined by the following procedure:

Each receiver was used in an electrophotographic apparatus as described in U.S. Pat. No. 4,473,029, the disclosure of which is incorporated herein by reference. The photoconductive element of the apparatus was provided with an organic photoconductor, as described in U.S. Pat. No. 5,213,927, the disclosure of which is incorporated herein by Sticking temperatures were determined using the same apparatus as for the transfer temperature measurements, but no toner particles were employed. The receiver surface was heated and contacted with the photoconductive element at the nip. The imminence of the sticking temperature was signaled by the sound of the photoconductor and receiver surfaces separating. The minimum temperature at which the separation caused damage to the surface of a receiver and/or the photoconductor is taken as the sticking temperature for that receiver.

Transfer and sticking temperature data, along with the glass transition temperature for the miscible blends of the invention and the control copolymers are given in Table 2 below.

TABLE 2

| Receiver | Copolymers | $T_g$ (°C.) | Transfer temperature (°C.) | Sticking temperature (°C.) | Transfer latitude (°C.) |
|---|---|---|---|---|---|
| I | 4 and 5* | 53 | 65 | 87 | 22 |
| II | 2 and 3* | 54 | 72 | >90 | >18 |
| III | 6 and 7* | 54 | 69 | >90 | >21 |

TABLE 2-continued

| Receiver | Copolymers | $T_g$ (°C.) | Transfer temperature (°C.) | Sticking temperature (°C.) | Transfer latitude (°C.) |
|---|---|---|---|---|---|
| IV (control) | 1 | 52 | 64 | 69 | 5 |
| V (control) | 8 | 54 | 64 | 72 | 8 |
| VI (control) | S5E** | 54 | 69 | 81 | 12 |

*blends at 1:1 weight ratio
**styrene-1,3-butadiene (85/15) copolymer available as Pliolite S5E ™ from Goodyear Co.

As shown in Table 2, receivers I, II, and III, which contain miscible 1:1 (by weight) blends of copolymers listed in Table 1, all had very similar glass transition temperature (53°–54° C). Their measured transfer temperatures lay between 65° and 72° C., and they all exhibited sticking temperatures of at least 87° C. These results translate to a transfer latitude of more than 18° C. in all cases.

Control receivers IV, V, and VI, each comprising a layer of a single copolymer, exhibited glass transition temperatures very nearly the same as those of the miscible blends employed in receivers I, II, and III. The measured transfer temperatures of control receivers IV, V, and VI were in the range of 64°–69° C., similar to those of the receivers of the invention. Sticking temperatures for IV, V, and VI, however, were well below those of receivers I, II, and III, and so the transfer latitude for the control receivers was distinctly inferior, falling in the range of 5°–12° C.

Thus, the results of Table 2 strikingly demonstrate the substantial and unexpected advantage in transfer latitude of toner receivers formed from the miscible copolymer blends of the present invention, compared with prior art polymeric materials.

The invention has been described in detail with particular reference to certain preferred embodiments thereof, but it will be understood that variations and modifications can be effected within the spirit and scope of the invention.

We claim:

1. An electrophotographic toner receiver for thermally assisted transfer comprising a substrate having a layer of a thermoplastic polymer composition on the surface thereof, said polymer composition comprising a miscible blend of a first addition copolymer and a second addition copolymer, each said addition copolymer having a weight-average molecular weight of about 30,000 to 100,000 and a number-average molecular weight of about 5,000 to 50,000, and each comprising repeating units of (1) at least one of an aromatic vinyl monomer of the structure,

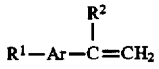

wherein Ar is phenylene or naphthylene and $R^1$ and $R^2$ are H or lower alkyl; and (2) at least one of (a) an acrylic ester of the structure

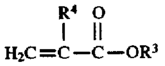

wherein $R^3$ is linear or branched $C_1$–$C_{10}$ alkyl and $R^4$ is H or lower alkyl, or (b) a divinyl compound of the structure

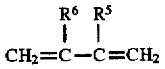

wherein $R^5$ and $R^6$ are H, Cl, or $CH_3$, said first addition copolymer further comprising repeating units of an acidic vinyl monomer and said second addition copolymer further comprising repeating units of a basic vinyl monomer.

2. The electrophotographic toner receiver of claim 1, wherein said acidic vinyl monomer comprises a compound having the structure

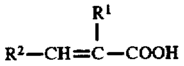 (a)

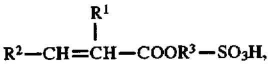 (b)

or $R^4-Ar-CH=CH_2$ (c)

wherein Ar is phenylene or naphthylene, $R^1$ is H or $CH_3$, $R^2$ is H or $C_1$–$C_6$ alkyl, $R^3$ is $C_2$–$C_6$ alkylene, and $R^4$ is —COOH or —$SO_3H$.

3. The electrophotographic toner receiver of claim 1, wherein said basic vinyl monomer is selected from the group consisting of 2-vinylpyridine, 4-vinylpyridine, and a compound having the structure

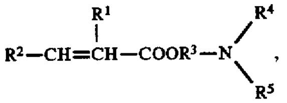

wherein $R^1$ is H or $CH_3$, $R^2$ is H or $C_1$–$C_6$ alkyl, $R^3$ is $C_2$–$C_6$ alkylene, and $R^4$ and $R^5$ are each $C_1$–$C_4$ alkyl.

4. The electrophotographic toner receiver of claim 1, wherein said first addition copolymer comprises 2 to 10 weight percent of said acidic vinyl monomer, and said second addition copolymer comprises 2 to 10 weight percent of said basic vinyl monomer.

5. The electrophotographic toner receiver of claim 1, wherein the ratio of aromatic vinyl monomer to acrylic ester or divinyl compound is from about 8:1 to 1:2.

6. The electrophotographic toner receiver of claim 1, wherein said aromatic vinyl monomer is selected from the group consisting of styrene, 3-methylstyrene, 4-methylstyrene, α-methylstyrene, 4-t-butylstyrene, and mixtures thereof.

7. The electrophotographic toner receiver of claim 1, wherein said acrylic ester is selected from the group consisting of ethyl acrylate, butyl acrylate, hexyl acrylate, 2-ethylhexylacrylate, and mixtures thereof.

8. The electrophotographic toner receiver of claim 1, wherein said divinyl compound is selected from the group consisting of 1,3-butadiene, 2-methyl-1,3-butadiene, 2-chloro-1,3-butadiene, 2,3-dimethyl-1,3-butadiene, and mixtures thereof.

9. The electrophotographic toner receiver of claim 1, wherein the weight ratio of first addition polymer to second addition polymer is about 1:1.

10. The electrophotographic toner receiver of claim 1, wherein said miscible blend has a glass transition temperature, $T_g$, of about 50° to 60°C.

11. The electrophotographic toner receiver of claim 4, wherein said first addition copolymer comprises styrene, butyl acrylate, and methacrylic acid, and said second addition copolymer comprises styrene, butyl acrylate, and 4-vinylpyridine.

12. The electrophotographic toner receiver of claim 4, wherein said first addition copolymer comprises 3-methylstyrene, 4-methylstyrene, 2-ethylhexylacrylate, and methacrylic acid, and said second addition copolymer comprises 3-methylstyrene, 4-methylstyrene, 2-ethylhexyl acrylate, and 4-vinylpyridine.

13. The electrophotographic toner receiver of claim 1, wherein said substrate comprises paper.

14. The electrophotographic toner receiver of claim 13, wherein said paper substrate further comprises a coating of polyolefin on both front and back sides.

15. The electrophotographic toner receiver of claim 1, wherein said substrate is a transparent film.

* * * * *